(12) United States Patent
Adolphi et al.

(10) Patent No.: US 7,177,537 B1
(45) Date of Patent: Feb. 13, 2007

(54) AUTOMATED PORTRAIT STUDIO

(75) Inventors: Earl J. Adolphi, Eden Prairie, MN (US); Michael J. Surma, St. Paul, MN (US); Gerald A. Jensen, Plymouth, MN (US)

(73) Assignee: Lifetouch, Inc., Eden Prairie, MN (US)

(*) Notice: Subject to any disclaimer, the term of this patent is extended or adjusted under 35 U.S.C. 154(b) by 147 days.

(21) Appl. No.: 10/959,655

(22) Filed: Oct. 6, 2004

(51) Int. Cl.
*G03B 15/06* (2006.01)

(52) U.S. Cl. .............................. 396/4; 396/266; 362/11

(58) Field of Classification Search ................ 396/1–5, 396/263, 266, 283, 287; 348/169, 370, 722; 362/4, 5, 11
See application file for complete search history.

(56) References Cited

U.S. PATENT DOCUMENTS

| | | | | |
|---|---|---|---|---|
| 3,604,913 A | * | 9/1971 | Crete | 362/8 |
| 5,077,640 A | * | 12/1991 | Butler, Jr. | 362/11 |
| 5,389,993 A | * | 2/1995 | Adolphi et al. | 396/3 |
| 5,481,439 A | * | 1/1996 | Goto | 362/5 |
| 5,508,774 A | * | 4/1996 | Klees | 396/1 |
| 5,534,963 A | * | 7/1996 | Adolphi et al. | 396/5 |
| 5,563,675 A | | 10/1996 | Adolphi et al. | 396/545 |
| 5,621,492 A | * | 4/1997 | Beveridge et al. | 396/2 |
| 6,606,458 B2 | * | 8/2003 | Umeda et al. | 396/110 |
| 2004/0218916 A1 | * | 11/2004 | Yamaguchi et al. | 396/263 |

* cited by examiner

*Primary Examiner*—W. B. Perkey
*Assistant Examiner*—Rishi S. Suthar
(74) *Attorney, Agent, or Firm*—Nikolai & Mersereau, P.A.; C. G. Mersereau (57) ABSTRACT

An automated studio and control system for taking photographs is disclosed that alleviates many exposure problems and simplifies variables with which the photographer must deal in order to achieve consistent high quality photographs. The studio includes a multi-light portrait lighting system, a subject location verification system and a system for varying backgrounds, all of which are tied to an integrated control system and synchronized to a camera.

33 Claims, 11 Drawing Sheets

EXPOSURE ISSUES--DIGITAL PHOTOGRAPHY

| EXPOSURE PROBLEMS | F-STOP AFFECT | EXPOSURE SOLUTIONS IMPLEMENTED | F-STOP AFFECT |
|---|---|---|---|
| EXPOSURE MEASURED AT CAMERA | .250 | EXPOSURE MEASURED WITH 7.5% GRAY CARD | 0 |
| NON F2.8 ZOOM LENSES | 1 | 28-75MM F2.8 ZOOM LENS | 0 |
| OUT OF SYNC. 1/125$^{TH}$ | .200 | SYNC. 1/60$^{TH}$ OR 1/125$^{TH}$ 4MLSEC STROBES | 0 |
| ELECTRONIC F-STOP SETTINGS | .333 | SET F-STOP AT LENS | 1/10 |
| ISO SETTINGS IN 1/3 STOP INCREMENTS | .333 | BIAS CONTROL OF ISO | 1/10 |
| BACKGROUND DIFFERENCES | .250 | ADJUST LIGHTS BASED ON BACKGROUNDS | 1/10 |
| PHOTOGRAPHING OFF THE POSE LINE | .250 | POSITION LIGHT / SONIC SENSOR | 0 |
| MAIN LIGHT POSITIONED INCORRECTLY | .250 | DETECT WITH SONIC SENSOR | 0 |
| FLASHING LIGHTS BEFORE RECHARGE | .333 | DELAY WITH PLC (2 SEC.) | 0 |
| LANES OF LIGHT | .333 | EDUCATION / INSTRUCTION | 0 |
| TOTAL POSSIBLE F-STOP AFFECT | 3.533 | TOTAL POSSIBLE F-STOP AFFECT | |

*FIG. 4*

FLASH LIGHTING RATIO CHART BASED ON POSITION AND BACKGROUND TYPE

| BACKGROUND TYPE | POSITION 1 | | POSITION 2 | | POSITION 3 | | POSITION 4 | |
|---|---|---|---|---|---|---|---|---|
| | NORMAL RATIO | INCREASED RATIO | NORMAL RATIO | INCREASED RATIO | NORMAL RATIO | INCREASED RATIO | NORMAL RATIO | INCREASED RATIO |
| WHITE | 1:2 | 1:3 | 1:2 | 1:3 | 1:2 | 1:3 | 1:2 | |
| LIGHT | 1:2 | 1:3 | 1:2 | 1:3 | 1:2 | 1:3 | 1:2 | |
| GRAY | 1:2 | 1:3 | 1:3 | 1:5 | 1:3 | 1:5 | 1:3 | |
| DARK | 1:2 | 1:3 | 1:3 | 1:5 | 1:3 | 1:5 | 1:3 | |
| BLACK | 1:2 | 1:3 | 1:3 | 1:5 | 1:3 | 1:5 | 1:3 | 1:9 |

FIG. 5

LIGHT BACKGROUND MAGNET POSITION 1

| POSITION | MAIN LIGHT IN THE UP POSITION ||||| MAIN LIGHT IN THE DOWN POSITION |||||
| | NORMAL RATIO || INCREASED RATIO || DEFAULT || NORMAL RATIO || INCREASED RATIO || DEFAULT ||
| | MAIN | FILL | MAIN | FILL | HAIR | BACK | MAIN | FILL | MAIN | FILL | HAIR | BACK |
|---|---|---|---|---|---|---|---|---|---|---|---|---|
| 1 | 164 1:2 | 200 | 200 1:3 | 180 | 184 | 230 | 164 1:2 | 200 | 200 1:3 | 180 | 280 | 230 |
| 2 | 164 1:2 | 200 | 200 1:3 | 180 | 184 | 230 | 164 1:2 | 200 | 200 1:3 | 180 | 280 | 230 |
| 3 | 148 1:2 | 200 | 180 1:3 | 180 | 184 | 230 | 148 1:2 | 200 | 180 1:3 | 180 | 280 | 230 |
| 4 | 164 1:2 | 200 | 200 1:3 | 180 | 184 | 230 | 164 1:2 | 200 | 200 1:3 | 180 | 280 | 230 |

FIG. 6a

WHITE BACKGROUND MAGNET POSITION 2

| POSITION | MAIN LIGHT IN THE UP POSITION ||||| MAIN LIGHT IN THE DOWN POSITION |||||
| | NORMAL RATIO || INCREASED RATIO || DEFAULT || NORMAL RATIO || INCREASED RATIO || DEFAULT ||
| | MAIN | FILL | MAIN | FILL | HAIR | BACK | MAIN | FILL | MAIN | FILL | HAIR | BACK |
|---|---|---|---|---|---|---|---|---|---|---|---|---|
| 1 | 164 1:2 | 200 | 200 1:3 | 180 | 184 | 350 | 164 1:2 | 200 | 200 1:3 | 180 | 280 | 350 |
| 2 | 164 1:2 | 200 | 200 1:3 | 180 | 184 | 350 | 164 1:2 | 200 | 200 1:3 | 180 | 280 | 350 |
| 3 | 148 1:2 | 200 | 180 1:3 | 180 | 184 | 350 | 148 1:2 | 200 | 180 1:3 | 180 | 280 | 350 |
| 4 | 164 1:2 | 200 | 200 1:3 | 180 | 184 | 350 | 164 1:2 | 200 | 200 1:3 | 180 | 280 | 350 |

FIG. 6b

GRAY BACKGROUND MAGNET POSITION 3

| POSITION | MAIN LIGHT IN THE UP POSITION ||||||| MAIN LIGHT IN THE DOWN POSITION |||||||
| | NORMAL RATIO || INCREASED RATIO || DEFAULT || NORMAL RATIO || INCREASED RATIO || DEFAULT ||
| | MAIN | FILL | MAIN | FILL | HAIR | BACK | MAIN | FILL | MAIN | FILL | HAIR | BACK |
|---|---|---|---|---|---|---|---|---|---|---|---|---|
| 1 | 164 1:2 | 200 | 200 1:3 | 180 | 184 | 230 | 164 1:2 | 200 | 200 1:3 | 180 | 280 | 230 |
| 2 | 200 1:3 | 180 | 262 1:5 | 82 | 184 | 230 | 200 1:3 | 180 | 262 1:5 | 82 | 280 | 230 |
| 3 | 180 1:3 | 180 | 236 1:5 | 82 | 184 | 230 | 180 1:3 | 180 | 236 1:5 | 82 | 280 | 230 |
| 4 | 200 1:3 | 180 | 262 1:5 | 82 | 184 | 230 | 200 1:3 | 180 | 262 1:5 | 82 | 280 | 230 |

FIG. 6c

DARK BACKGROUND MAGNET POSITION 0 AND 1 & 2

| POSITION | MAIN LIGHT IN THE UP POSITION ||||| MAIN LIGHT IN THE DOWN POSITION |||||
|---|---|---|---|---|---|---|---|---|---|---|
| | NORMAL RATIO || INCREASED RATIO || DEFAULT || NORMAL RATIO || INCREASED RATIO || DEFAULT ||
| | MAIN | FILL | MAIN | FILL | HAIR | BACK | MAIN | FILL | MAIN | FILL | HAIR | BACK |
| 1 | 164 1:2 | 200 | 200 1:3 | 180 | 184 | 142 | 164 1:2 | 200 | 200 | 180 | 280 | 142 |
| 2 | 200 1:3 | 180 | 262 1:5 | 82 | 184 | 142 | 200 1:3 | 180 | 262 1:5 | 82 | 280 | 142 |
| 3 | 180 1:3 | 180 | 236 1:5 | 82 | 184 | 142 | 180 1:3 | 180 | 236 1:5 | 82 | 280 | 142 |
| 4 | 200 1:3 | 180 | 288 1:9 | 20 | 184 | 142 | 200 1:3 | 180 | 288 1:9 | 20 | 280 | 142 |

*FIG. 6d*

BLACK BACKGROUND MAGNET POSITION 1 & 3

| POSITION | MAIN LIGHT IN THE UP POSITION ||||| MAIN LIGHT IN THE DOWN POSITION |||||
| | NORMAL RATIO || INCREASED RATIO || DEFAULT || NORMAL RATIO || INCREASED RATIO || DEFAULT ||
| | MAIN | FILL | MAIN | FILL | HAIR | BACK | MAIN | FILL | MAIN | FILL | HAIR | BACK |
|---|---|---|---|---|---|---|---|---|---|---|---|---|
| 1 | 164 1:2 | 200 | 200 1:3 | 180 | 184 | OFF | 164 1:2 | 200 | 200 1:3 | 180 | 280 | OFF |
| 2 | 200 1:3 | 180 | 262 1:5 | 82 | 184 | OFF | 200 1:3 | 180 | 262 1:5 | 82 | 280 | OFF |
| 3 | 180 1:3 | 180 | 236 1:5 | 82 | 184 | OFF | 180 1:3 | 180 | 236 1:5 | 82 | 280 | OFF |
| 4 | 200 1:3 | 180 | 288 1:9 | 20 | 184 | OFF | 200 1:3 | 180 | 288 1:9 | 20 | 280 | OFF |

FIG. 6e

AUTOMATED PORTRAIT STUDIO

BACKGROUND OF THE INVENTION

I. Field of the Invention

The present invention relates generally to commercial studio portrait photography and, more particularly, to an automated control system and method for portrait composition that coordinates lighting aspects, backgrounds, subject location and synchronizes camera operation.

II. Related Art

Commercial studio portrait photography has evolved from the use of tripod-mounted cameras to hand-held cameras. In addition, subjects are being photographed on the floor with many different shades of backgrounds. These techniques have advantages, but serious exposure problems have also been encountered which affect product quality and impede required production efficiencies, particularly in high volume studios.

The problems are of several types. Subjects not on a predetermined pose line or mark can be over or under exposed. For example, if the subject(s) are in front of the pose line, they will be overexposed because they are closer to the lights. Conversely, if the subjects are behind the pose line, they will be underexposed because they are further from the lights. The use of different backgrounds also poses certain problems. The exposure of subjects on the floor varies with the use of light or dark backgrounds. Light backgrounds tend to overexpose the subject because of increased reflection of light onto the subject. Dark backgrounds, on the other hand, tend to lead to underexposed subjects because they absorb light that would normally be reflected onto the subject. Each shade of background (light to dark) requires a commensurate correct amount of background light illumination. For example, overexposing a black background by using too much "background light" causes a black background to wash out to a grayish color. Conversely, white backgrounds look grayish if underexposed by not having sufficient "background light".

It has also been found that often subjects are photographed too fast, that is, the exposure is made before the illuminating lights can properly recharge, for example, which causes underexposure. This is particularly true in the case of recharging strobe power packs.

Variations also occur due to the location of the lights relative to the subject being photographed. Thus, photographing subjects on the floor requires the photographer to move the lights down, otherwise the subject will be underexposed. Conversely, if the subject is standing, the lights need to be moved up or the subject will be overexposed.

Other lighting parameters which affect the quality of studio portrait photography include the positioning of studio lighting and variation in "lighting ratios". "Lighting ratios" is a term used in the art to describe the relative differences in power between the main and fill lights used in photographing a subject. The "main light" refers to the lights used to generally illuminate the subject (equivalent to the sun in outdoor photography). This light is generally controlling and is what the photographer starts with when composing the scene in a photograph. "Fill lights" are non-directional lighting used to highlight the scene or subjects(s). The "lighting ratio" refers to the relative ratio between the main and fill lights. The skilled photographer needs to know what ratios are best for what situation and how to mathematically calculate these values. For example, a 1:2 lighting ratio (flat) provides excellent results when photographing family groups. On the other hand, a 1:7 lighting ratio (high contrast) is preferred for dramatic individual low-key photography (black background). It has also been found that the position of the main light relative to the subject(s) is critical to the lighting ratio chosen and to the background that is chosen.

Given the above, it will be readily recognized that there are many important variables with which the photographer must deal in order to achieve consistent high quality photographs. Compound this with the need for a rapid throughput in high-volume commercial portrait photography business which puts a heavy burden on the photographer. Even small, low-volume studios find dealing with all the variables, combinations and situations very difficult to manage successfully.

Integrating all the available tools including the ability to change lighting ratios presents a definite sustainable competitive advantage, and automation of such techniques would be a very desirable improvement. Such automation would also facilitate training of photographers to achieve uniform excellent results.

SUMMARY OF THE INVENTION

By means of the present invention, there is provided an automated studio and control system for taking photographs that alleviates many exposure problems and simplifies the variables with which the photographer must deal in order to achieve consistent high quality photographs. The studio includes a multi-light portrait lighting system, a subject location verification system and a system for varying backgrounds, all of which are tied to an integrated control system and synchronized to a camera.

The exemplary detailed embodiment includes a four-light portrait lighting system which includes a main light capable of being located at a plurality of positions and heights relative to the location of a subject to be photographed, a fill light, a background light and a hair illuminating light. Each light may be controlled both for on/off and power level. Operation of all four lights is coordinated with other lights and camera operation. The system also includes a subject position locator on the floor of the studio which may be a pose line or mark. A sensor is provided that detects whether the subject(s) are on the pose line or otherwise in a predetermined position for being photographed. The system includes an ultra-sonic sensor which also detects whether the subjects are standing, sitting on a stool or on the floor. The sensor is attached to a position light so that the photographer can visually tell if the subject(s) are on the pose line. A background track is located behind the subject position along which a variety of backgrounds can be mounted. A plurality of backgrounds are available which include light backgrounds, white backgrounds, medium backgrounds and black or other dark backgrounds which can be interchanged as desired. A unique pattern of magnets is located on each type of background. Rows of magnet-detecting sensors in fixed locations identify the particular background being used.

The system is controlled preferably using a programmable logic controller (PLC). Inputs to the controller include signals based on sensing whether the subject or subjects are on the pose line or mark and whether they are on the floor, standing or sitting. Other sensors provide signals based on sensing the up and down position of the main light and the position of the main light relative to the pose line. Also, the shade of the background being used is sensed and the enablement of the camera and/or synchronization is controlled. A variety of audible buzzers and visual LED indicator lights may be used to interface with the photographer and present information as to the status of exposure variables. Thus further enables the photographer to make informed adjustments in subject position, increase lighting ratio or other modifications as indicated prior to making the exposure. The controller controls the output of all lights and, based on sensor inputs, enables a plurality of lighting ratios to be implemented with a single control button.

A communication link is maintained between the control system and the camera.

Synchronization of camera operation generally includes:

A. A programmable delay to ensure that the lighting is ready, i.e., is recycled (typically using a recharging strobe power pack).

B. The proper position of the subject or subjects with respect to the pose line.

C. The up/down position of the main light.

D. The position of the main light on the main light track.

E. The correct main light modifier/baffle.

Once all the variables are coordinated, the camera is enabled and the photograph may be taken.

BRIEF DESCRIPTION OF THE DRAWINGS

In the drawings, wherein like numerals depict like parts.

DETAILED DESCRIPTION

The apparatus and control systems of the invention are designed in combination to address and overcome many common problems encountered in relatively high volume commercial photo studio experience which tend to affect product quality. The invention, however, is equally applicable to any studio seeking consistent high quality photographs. The system described in detail herein is presented by way of example and is not intended to limit the scope of any aspect of the inventive concept.

Figure 1:
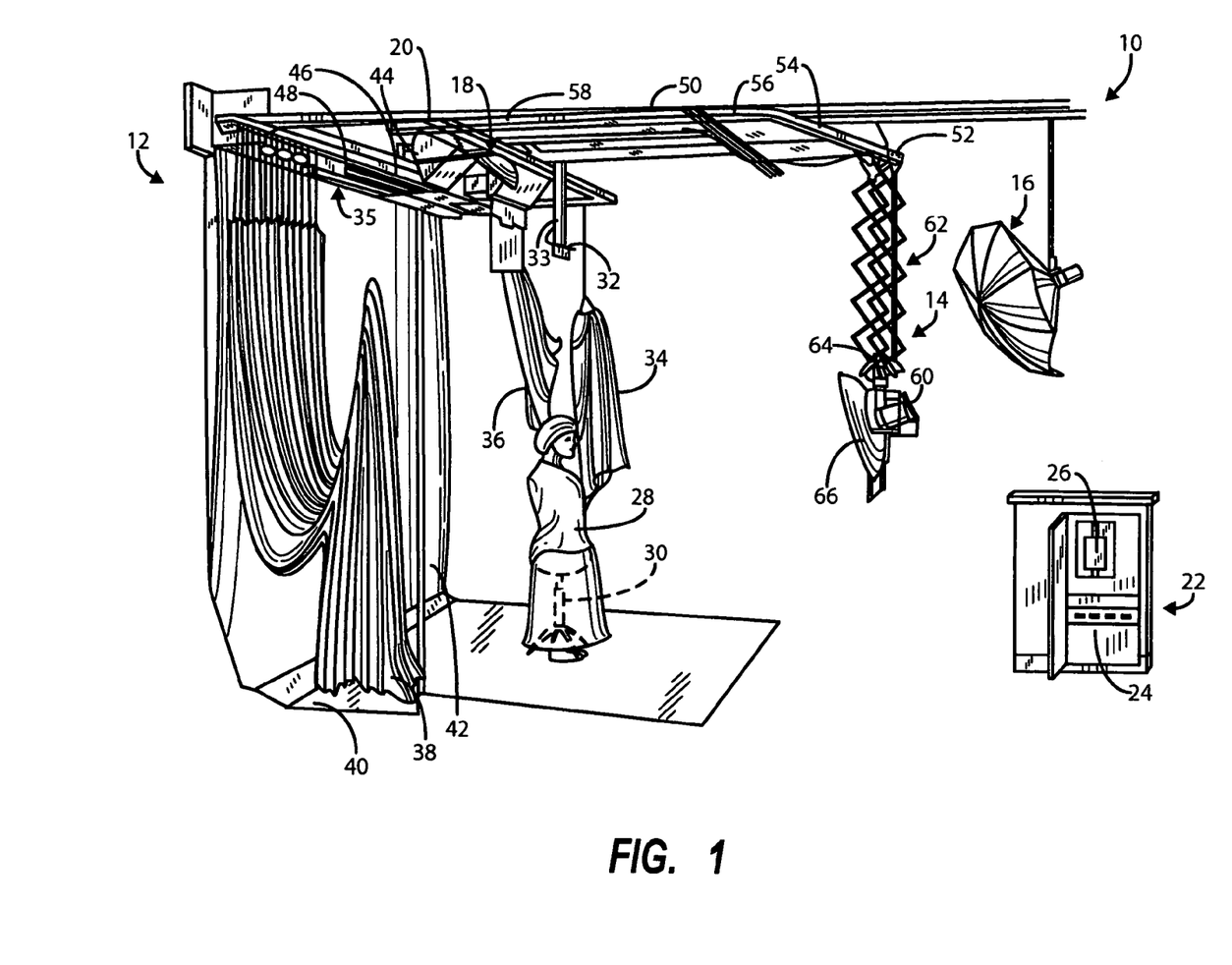
FIG. 1 is a schematic representation depicting a commercial portrait studio set up using a photography system in accordance with the invention.

FIG. 1 is a schematic representation of a commercial photo studio 10 showing the main elements of the system of the invention. A background system, generally at 12, permits the backgrounds used to be altered and automatic adjustment of the system based upon the background selected. A four-light portrait lighting system is employed which includes a main light system 14, a fill light as shown at 16, a background light at 18 and a hair light at 20. Each light is controlled both for on/off and power level as will be explained. A cabinet 22 contains a strobe power pack for controlling lighting at 24 and a control system indicated at 26. A subject 28 is depicted on a stool 30 which may be positioned based on a positioning mark or pose line (not shown) on the floor of the studio.

An ultra-sonic sensor 32 is positioned above the pose line so as to sense the presence of a subject and to detect whether the subject is in proper position with respect to the pose line to be photographed. As will be described, the ultra-sonic sensor 32 is linked to a controller which locks out or prevents operation of an associated camera if the sensor 32 fails to verify the presence of a subject to be photographed in the proper position with respect to the pose line and, conversely, unlocks or enables an interlock associated with the operation of the camera when the subject to be photographed is in proper position. As will be described, additional interlocks associated with other aspects of the system must also be enabled for the camera to operate. The sensor also senses whether the subject is standing (elevated) or sitting on the floor. The sensor 32 is attached to a position light 33 so that the photographer can also visually tell if the subject or subjects are on the pose line.

The background system includes a default background and a rail or track between the default background and the locations where subjects to be photographed are to be positioned. A variety of available backgrounds can be mounted to the rail or track. These include five basic backgrounds including light 34, white 36, gray 38, black 40, and other dark backgrounds 42. They are mounted along a track system generally at 35. As can best be seen in FIG. 3a, the backgrounds are provided with magnetic sets which are correlated to background sensors as at 44 (position 3), 46 (position 2) and 48 (position 1). FIGS. 3a–3d illustrate a possible magnet and sensor configuration for five different backgrounds in which light backgrounds are provided with one magnet set on the right side of the background; white backgrounds are provided with one magnet set in the middle of the background; and gray backgrounds are provided with one magnet set on the left side of the background. Black and dark backgrounds are provided with two magnets with black backgrounds having one on the right and one of the left side of the background; and other dark backgrounds are provided with one magnet on the right and one in the middle of the background. Thus, depending on where magnets are sensed, the background sensing system will identify the background and adjust the light level on the background accordingly. Alternative background identification systems can be used without deviating from the invention such as a unique bar code applied to each background and a bar code reader mounted to the rail or track capable of reading the bar code and transmitting signals to the controller. Video identification of the backgrounds is another method that could be used. Also, additional tracks 35 can be provided for enhanced flexibility.

The main light system 14 of the four-light portrait lighting system includes a main light rail 50 which is provided with an array of main light position sensors as at 52, 54, 56 and 58 which correspond to four discreet positions (FIG. 2) from which a main light 60 may be suspended at multiple heights utilizing a suspension arrangement as at 62. The light 60 may be provided with an up/down switch, preferably a micro-switch, as at 64 to indicate whether the light 60 is in an up or down position. A main light modifier sensor 66 may also be provided to indicate whether a baffle or other modifier, or no modifier is in place with respect to the main light.

Figure 2:
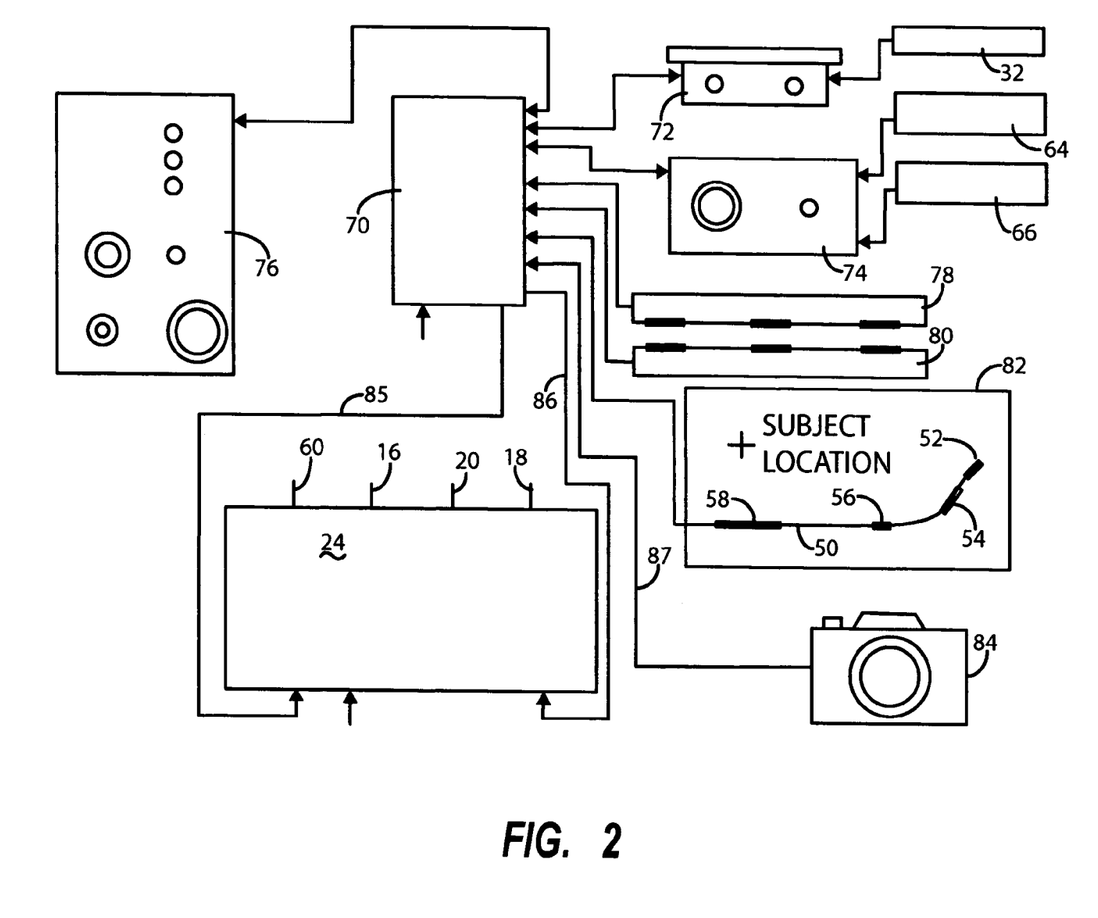
FIG. 2 is a schematic control system diagram for the photographic system of FIG. 1.
Figure 3A:
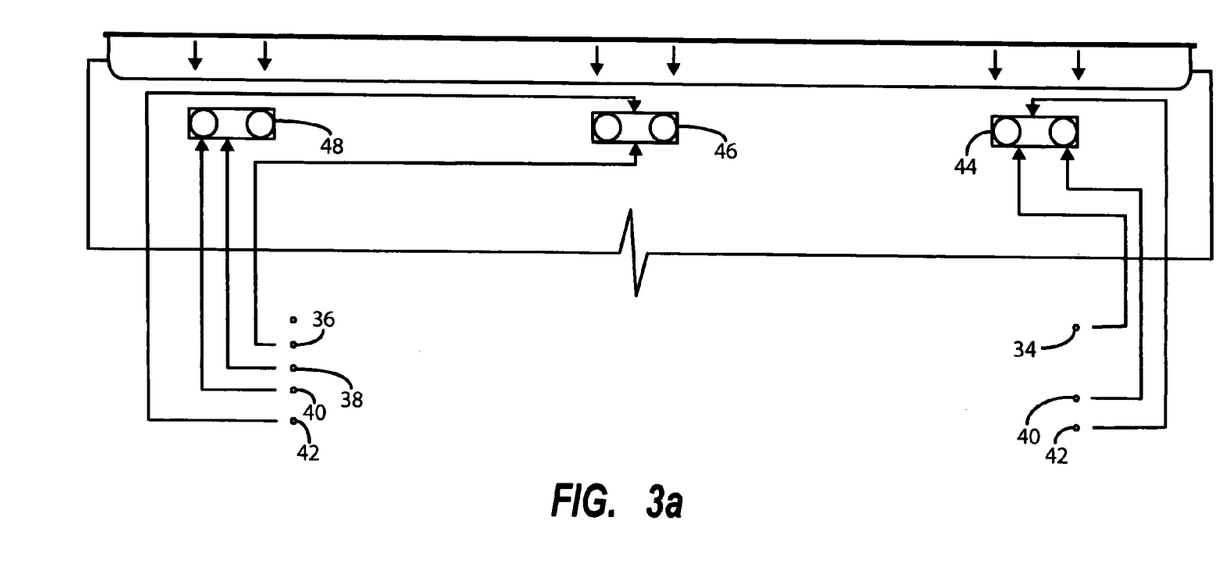
FIGS. 3a–3d show certain detail elements of the control system of FIG. 2.
Figure 3B:
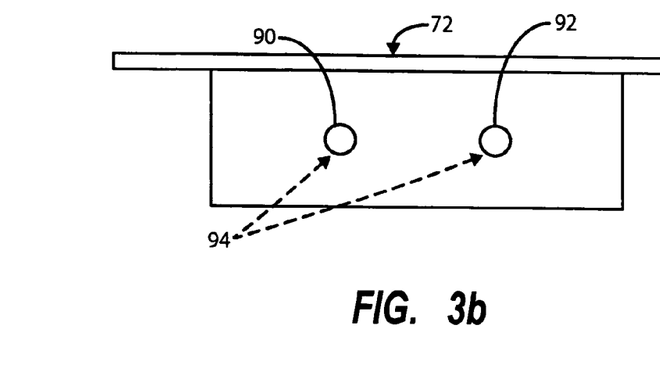
Figure 3C:
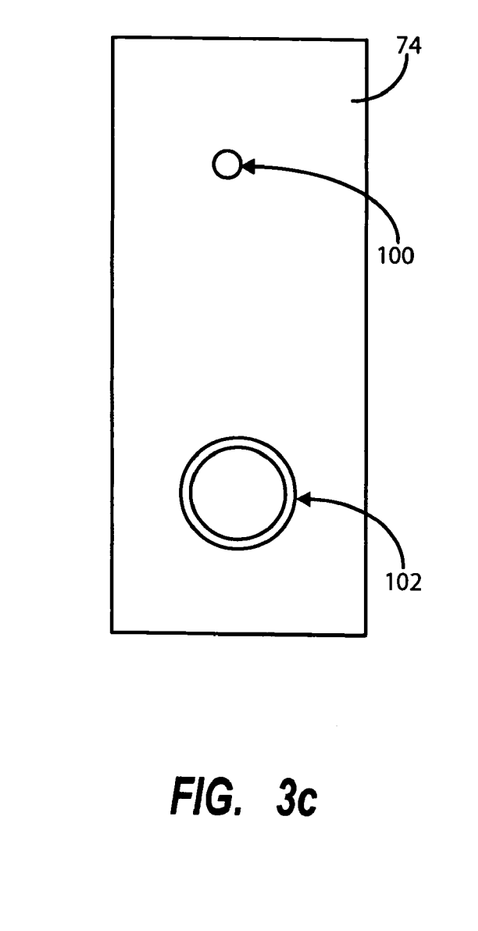
Figure 3D:
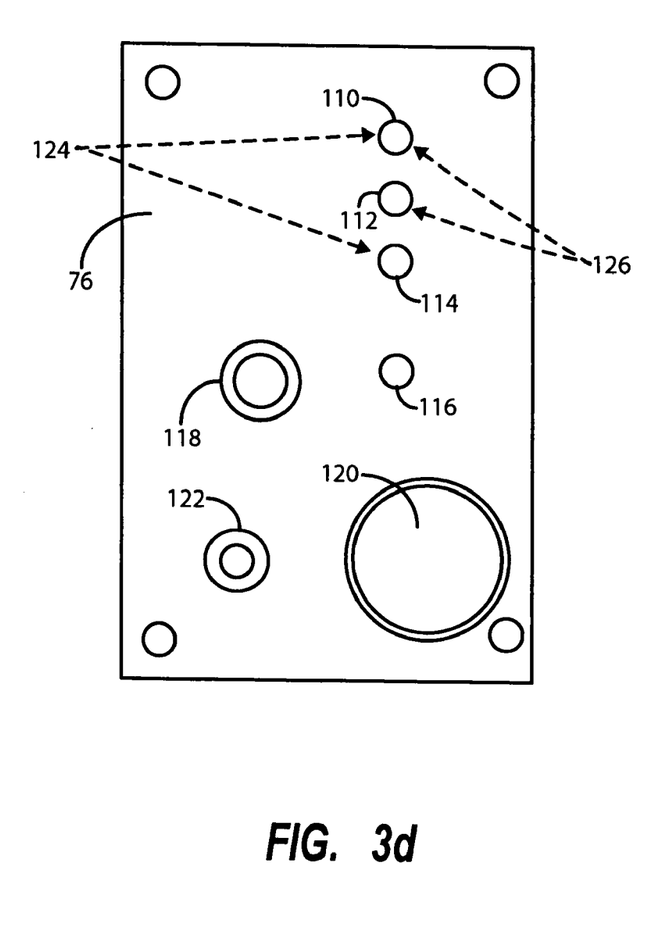

A schematic block diagram of an automatic portrait lighting control system to control a studio in accordance with FIG. 1 is depicted in FIG. 2 and certain additional details are depicted in FIGS. 3a–3d. As can be seen in FIG. 2, the heart of the control system is a programmable logic controller (PLC) 70 which operates in conjunction with several control panels having indicator lights, including an ultra-sonic indicator panel 72, a main light control panel 74 and a general control panel 76. Front and back background sensing tracks are shown at 78 and 80, respectively, and relative subject location are indicated in the dashed-line box 82. A synchronized camera is shown at 84. Communication links are shown at 86 and 87.

The PLC 70 receives a variety of signals and processes these signals to control the operation of the lights and camera. Specifically, the PLC 70 receives signals from (a) the ultra-sonic sensor 32 indicative of the presence and height of a subject to be photographed in the correct position; (b) the background system indicative of which background will be in the picture; (c) the main light system indicative of the position and height of the main light as well as whether a modifier/baffle is in place over the main light. The PLC 70 processes these input signals in response to a programmed set of instructions and by a finite number of operator inputs which are made by the photographer via various switches described elsewhere herein that are a part of the system. Based upon the inputs received, the PLC 70 locks and unlocks the camera, coordinates operation of the lighting system with the operation of the camera, and causes various indicator lights to illuminate and, if all is not right and the photographer tries to take a picture, an audible alarm sounds.

The ultra-sonic indicator panel 72 includes two indicator lights, a green light 90 and a red light 92. The lights are designed to operate individually or in combination to indicate certain conditions. Thus, if both lights are off, as at 94, this indicates that the subject or subjects are not in proper position to be photographed, i.e., not on the pose line, etc. In this indicated condition, a synchronized camera will not be enabled and, if desired, a buzzer can be activated if an exposure is attempted. If the red light alone is on, this means that the main light 60 is not in the right position (up/down) to properly light the subject or subjects in the position they are sensed. If the green light 90 alone is illuminated, this indicates that insofar as the ultra-sonic indicator is concerned, it is permissible to take an exposure.

The main light control panel 74 also includes two indicator lights, namely, a green LED 100 and a larger push button with amber LED 102. Illumination of the green light indicates that the main light is in a correct position on the track 50 and the correct modifier/baffle is in place on the main light. The up/down switch 64 is preferably a conventional micro-switch and the sensors 52, 54, 56 and 58 along track 50 may be proximity sensors or other conventional position sensing devices. Thus, an initial lighting ratio is established by the background sensed and the position of the main light sensed. Any modifiers (devices used in front of the light such as baffles) required for the main light can also be sensed. Correct settings are indicated by the illumination of the green light 100 which indicates the main light is in one of the four correct positions and the correct modifier has been applied. Conversely, if the green LED is off, this means that the main light is not in the correct position and/or a modifier should be put on or taken off. As was the case with the ultra-sonic sensor panel, a buzzer can be provided to sound if an exposure is attempted when the main light is not in a correct position on the track or if a modifier/baffle is required. If an exposure is attempted in any such situation, the camera and/or lights will not be enabled.

The larger amber button light 102 controls and indicates the use of an increased lighting ratio. Pressing this button will increase lighting ratio from the normal calculated by the system to an increased ratio (see FIG. 5) and this will also illuminate the amber light. Conversely, when the button is not illuminated, the system is at the originally calculated normal lighting ratio for that type of exposure.

Control panel 76 includes an array of indicator lights and other devices. This includes three amber LED indicator lights 110, 112 and 114 as shown best in FIG. 3d. A red indicator light 116, a hair light control button 118, a buzzer device 120 and, if desired, a phone jack for a passport camera is shown at 122. The three amber lights 110, 112 and 114 are used singularly and in combination to indicate, for example, which of the five different types of backgrounds is sensed. Thus, in one configuration, the lighting of indicator light 110 alone may be used to indicate a background sensed in position 1 by sensors 44 which would indicate a light background as per FIG. 3a. Likewise, illumination of indicator light 112 would indicate sensing at position 2 by sensors 46 which, in turn, indicates a white background. When indicator 114 alone is lit, this indicates sensing at position 3 only, which, in turn, indicates the presence of a gray background. With both lights 110 and 114 illuminated, as at 124, this indicates background sensed by sensors 48 and 44 indicating background sensed in both positions 1 and 3 which would correspond to a black background. Finally, as shown at 126, with indicator lights 110 and 112 illuminated, this indicates background sensed at positions 1 and 2 which corresponds to the sensing of other dark backgrounds.

Red light 116 may be designed to come on when the hair light is off and is extinguished when button 118 is used to turn the hair light on. The hair light is designed to return to a default or on state after five minutes and when this occurs. The buzzer 120 may be connected to sound in such case.

Figure 4:
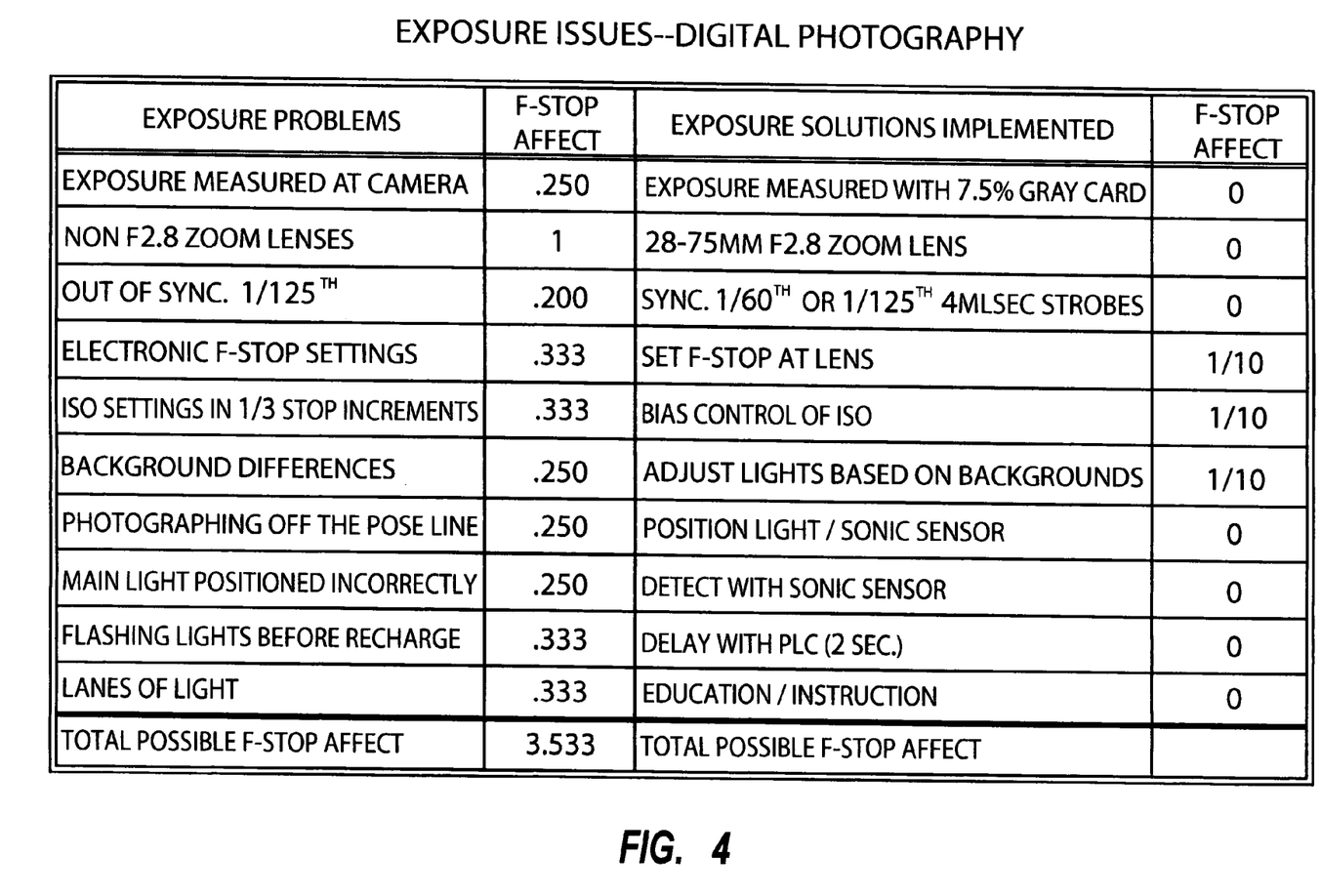
FIG. 4 is a chart depicting certain exposure problems and solutions using the control system of the invention.

FIG. 4 is a table which lists common exposure problems encountered in studios of a class suitable for implementation with the system of the present invention. The table also lists the related effect on aperture opening or F-stop of each problem. To the right are listed corresponding exposure solutions implemented and the corresponding reduction in F-stop effect. Note that the adjustment of lights based on backgrounds, use of sonic sensors to detect the position of the subject and main light and light synchronization and delay alone reduce the total possible F-stop effect attributable to these causes alone from 1.28 to 0.1. Other factors have to do with the camera itself or operation of the camera and exposure meter.

Figure 5:
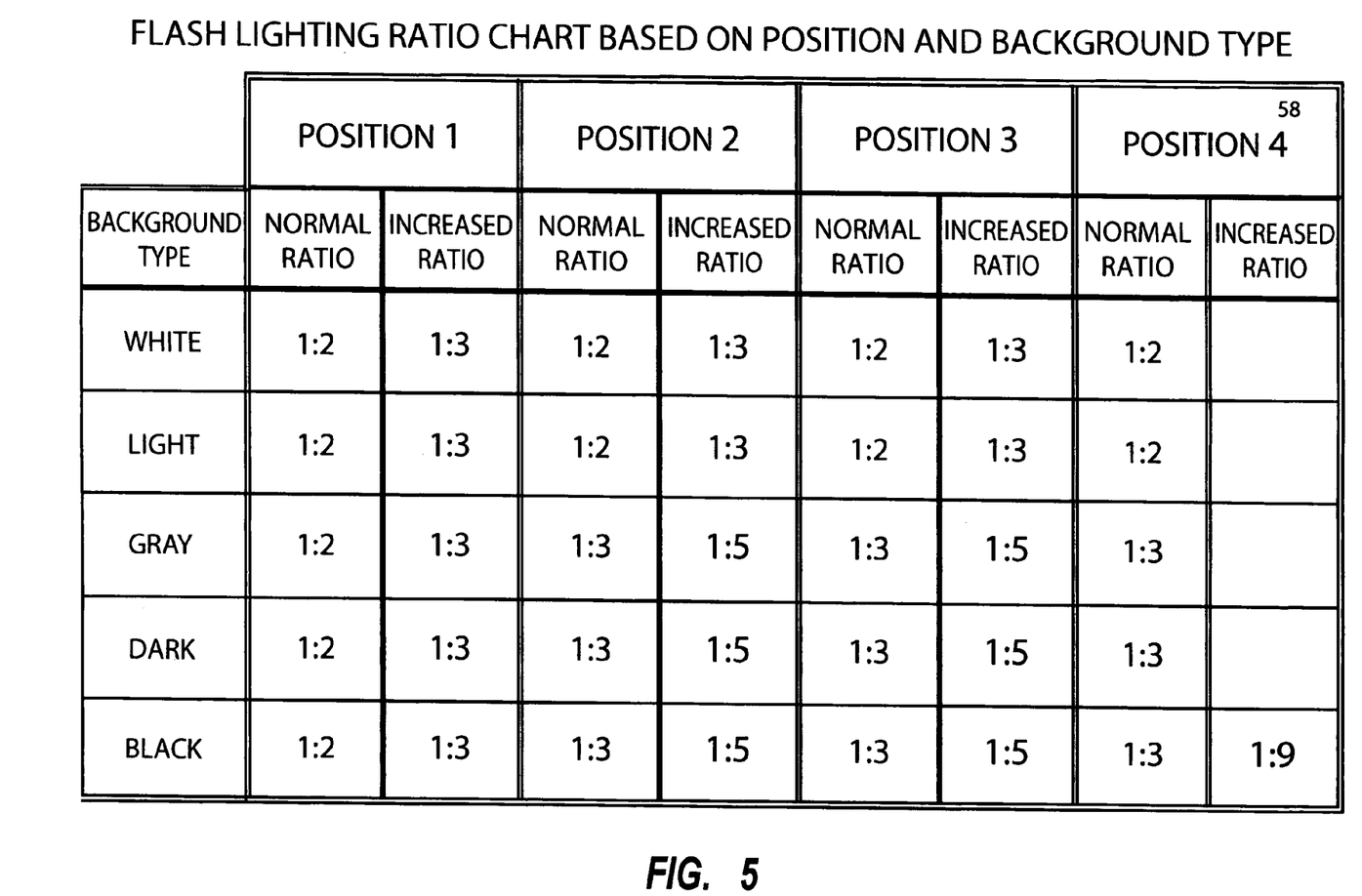
FIG. 5 is a flash lighting ratio chart based on position and background types showing corrections in accordance with the invention.
Figure 6A:
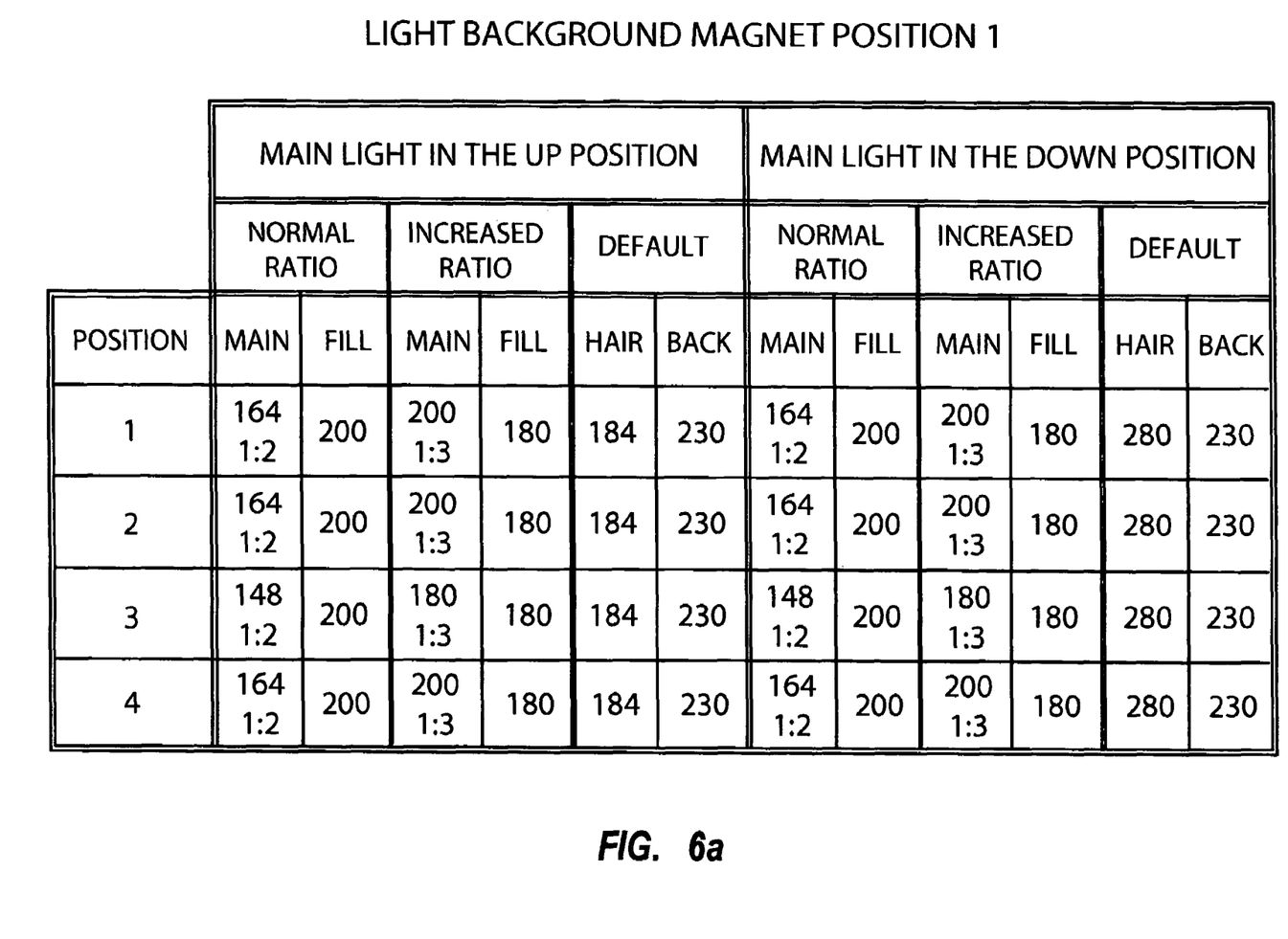
FIGS. 6a–6e are charts that show combinations of lighting settings for various backgrounds with different main light positions as implemented by the control system of the invention.
Figure 6B:
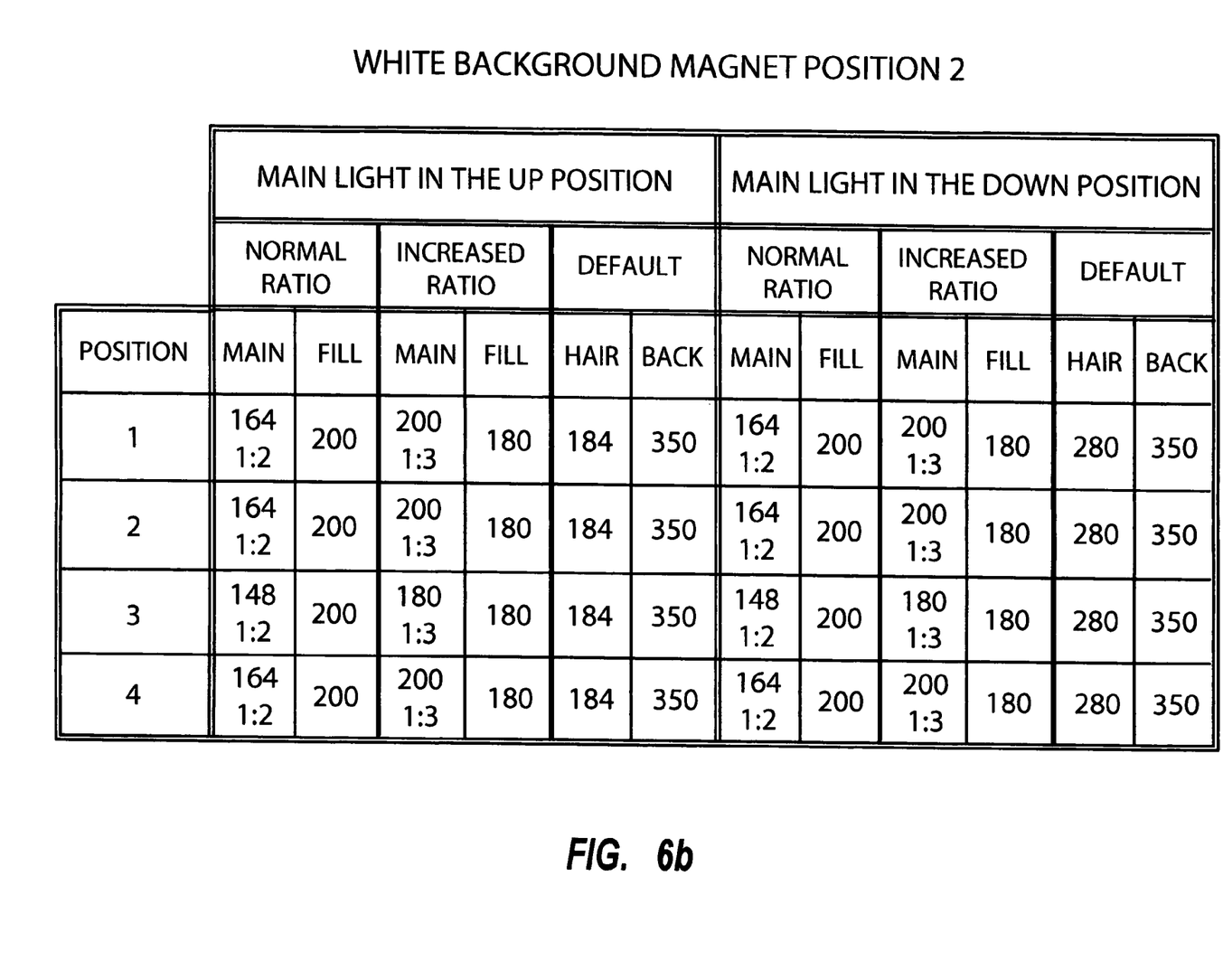
Figure 6C:
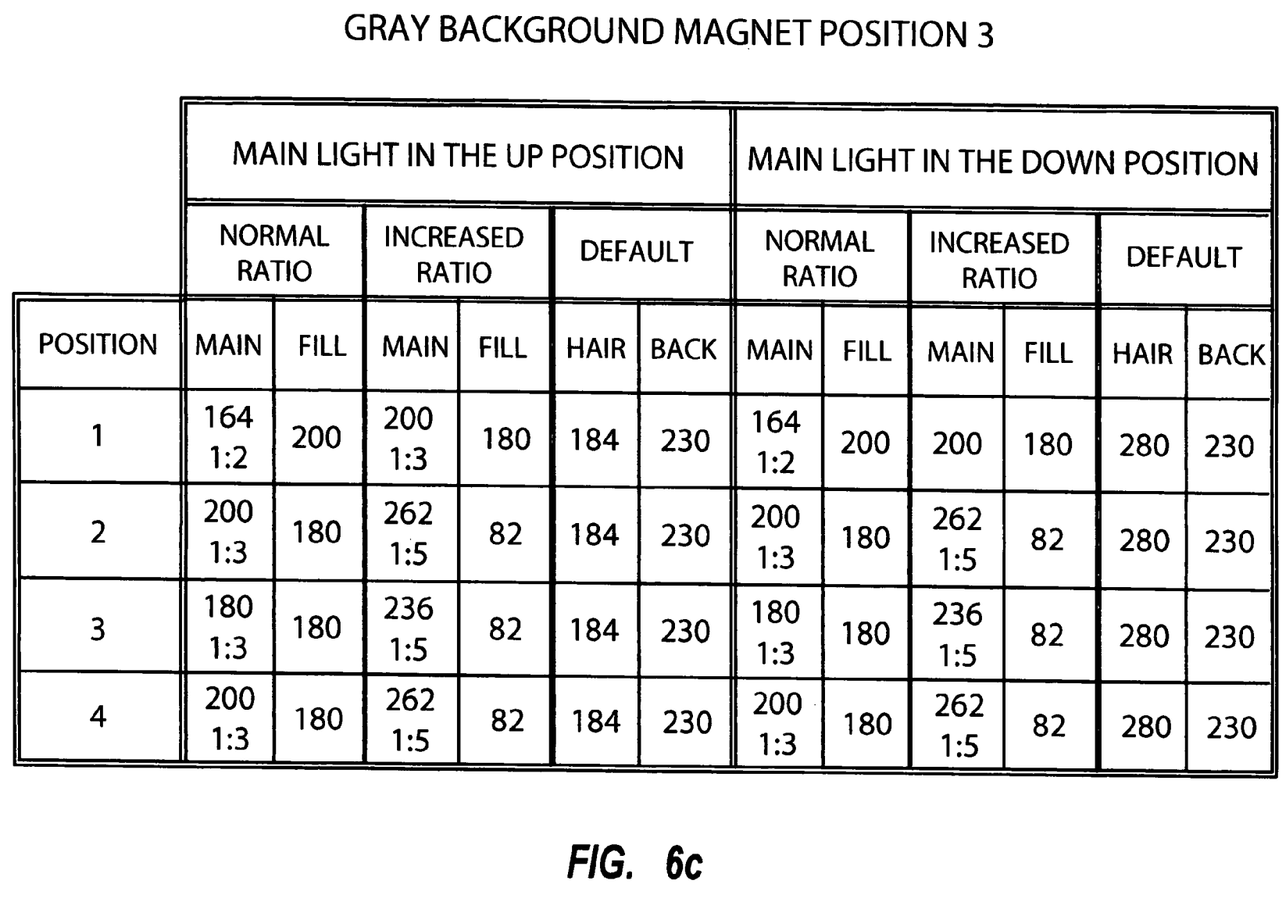
Figure 6D:
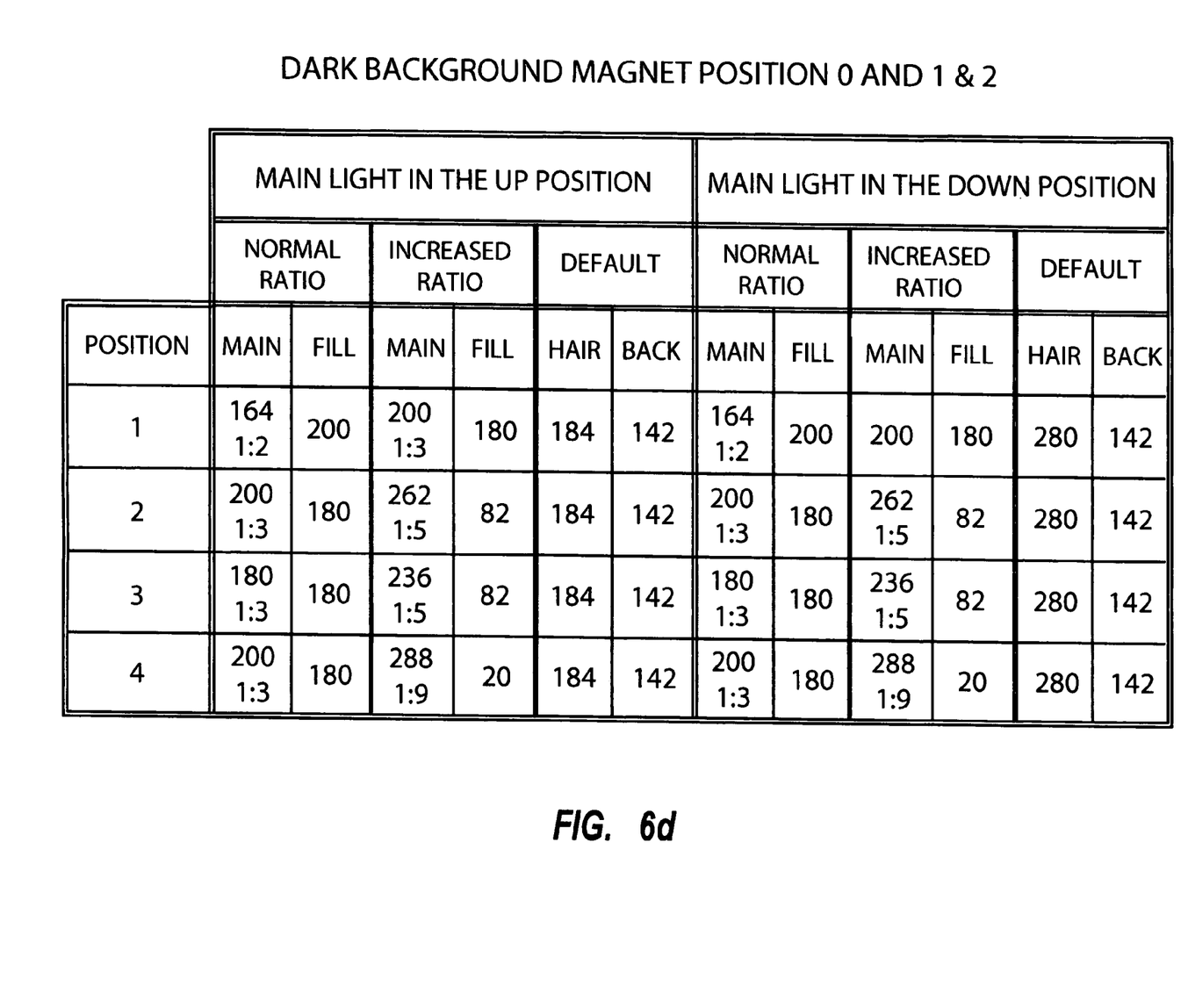
Figure 6E:
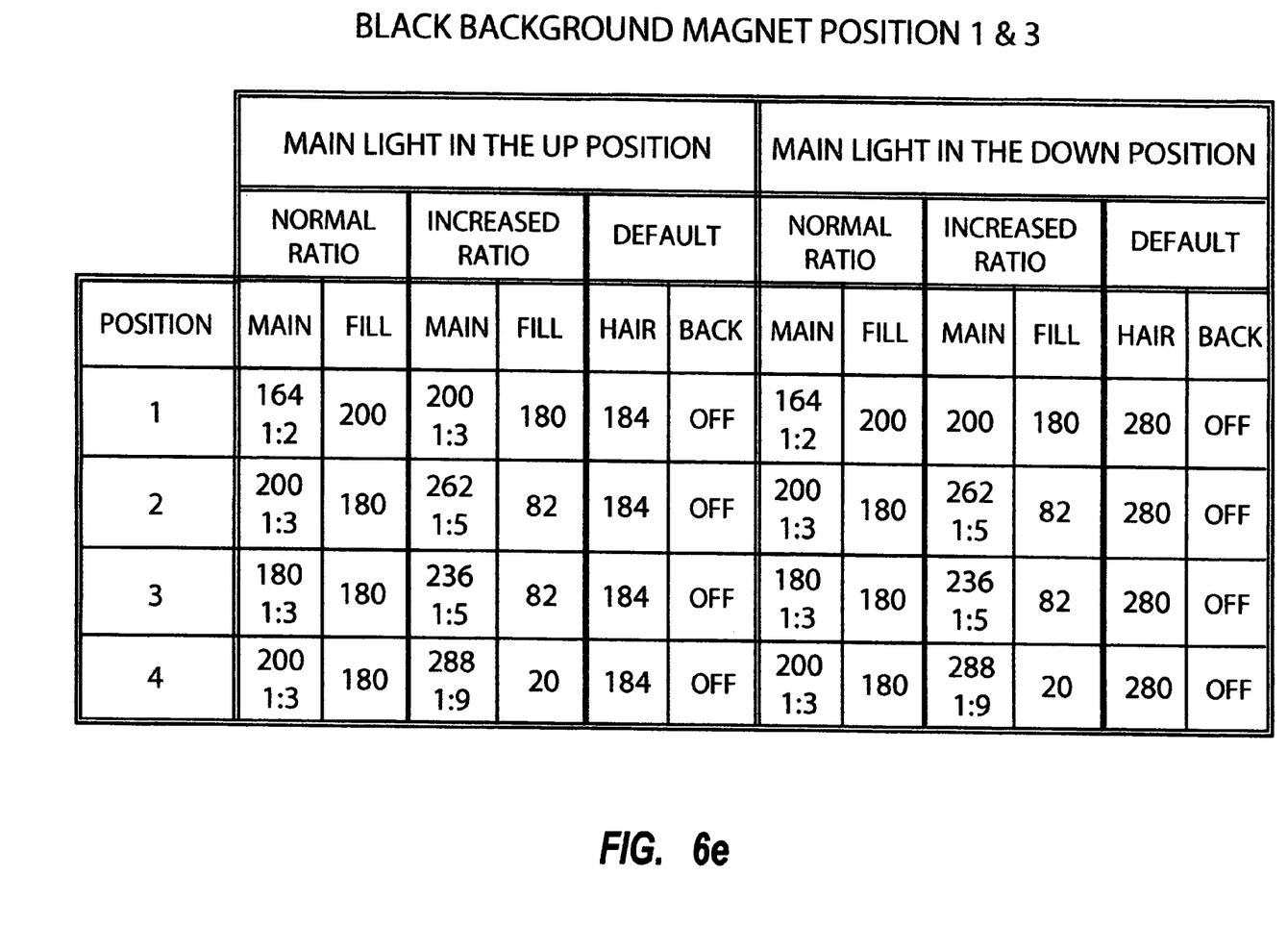

FIG. 5 is a flash lighting ratio chart based on position of background types showing normal and increased flash lighting ratio settings based on those factors. The chart shows the alternate or increased settings available using button 102. Position numbers refer to the position of the main light along the position rail 50. These alternate or increased ratios have been shown to produce excellent results.

FIGS. 6a–6e are charts that show combinations of lighting settings for various backgrounds with the different main light positions including the use of normal increased and default flash lighting ratios. They include settings for main, fill, hair and background lighting under these conditions. Note that the numbers can vary significantly from the uncorrected or default readings. Thus, with the automatic control system on, the system will adjust each of the four lights and the four-light portrait lighting system with each light being controlled by the strobe power pack 24 which has the ability to control not only the on/off setting of the light, but also for adjusting the power level from, for example, 20 to 400 watt seconds. The strobe power pack 24 communicates with the PLC 70 through a serial control line 85 and synchronization is achieved via line 86. The camera is synchronized via camera sync line 87, which may indicate a tether or remote communication link.

In operation, the photographer first composes the scene by (a) positioning the subject or subjects to be photographed substantially along the position locator or pose line, (b) selecting a background and (c) positioning the main light up or down and at the desired main light position along the light track. With the automated control system activated, all the sensors will provide data to the programmable logic controller which, utilizing ladder programming, provides camera synchronization first and then synchronizes the strobe power pack. In this manner, the ultra-sonic indicator panel will confirm the correct subject position by illuminating the green LED. The general control panel will indicate the correct background having been sensed and the hair light can be activated, if desired. Likewise, the main light control panel will indicate whether the main light is in the correct position and whether a correct modifier is in place. At this point, the lighting ratio can be increased if desired and camera sync established. Thereafter, the programmable delay assures that the strobe power pack is recycled and ready to fire and the serial line to the strobe power pack turns the channels off and on and sets the power levels for the four lights. This having been done, the exposure can be made.

This invention has been described herein in considerable detail in order to comply with the patent statutes and to provide those skilled in the art with the information needed to apply the novel principles and to construct and use such specialized components as are required. However, it is to be understood that the invention can be carried out by specifically different equipment and devices, and that various modifications, both as to the equipment and operating procedures, can be accomplished without departing from the scope of the invention itself.

What is claimed is:

1. An apparatus for taking photographs in a studio comprising:
   (a) a subject sensor that detects whether the subject to be photographed is in a predetermined position;
   (b) a camera having an actuator for initiating the capture of an image from a predetermined area;
   (c) a controller coupled to the sensor and said camera which locks the camera from initiating the capture of an image even when said activator is activated if the sensor fails to detect a subject to be photographed in the predetermined position and enables the camera so that an image can be captured when a subject to be photographed is in the predetermined position;
   (d) a track for carrying any of a plurality of backgrounds;
   (e) at least one sensor for detecting (i) whether a background is in position and, if so, (ii) which of said plurality of backgrounds is in position; and
   (f) a background light coupled to the controller, the intensity of which is controlled by the controller based upon whether any background is in position and, if so, which of said plurality of background is in position.

2. An apparatus as in claim 1 further including a visual indicator indicating whether the subject to be photographed is in the predetermined position.

3. An apparatus as in claim 1 further including an audible alarm that sounds if the actuator is activated and the sensor fails to detect a subject to be photographed in the predetermined position.

4. An apparatus as in claim 1 wherein said subject sensor is capable of detecting the height of the subject to be photographed when the subject to be photographed is in the predetermined position.

5. An apparatus as in claim 4 further including a main light, having an intensity of which is controlled by the controller.

6. An apparatus as in claim 5 wherein the height of said main light is adjustable.

7. An apparatus as in claim 5 further including a fill light, having an intensity which is controlled by the controller.

8. An apparatus as in claim 5 further including a background light, having an intensity which is controlled by the controller.

9. An apparatus as in claim 5 further including a hair light, having an intensity which is controlled by the controller.

10. An apparatus as in claim 5 further including a main light track to which the main light is mounted for movement between a plurality of predetermined image illumination positions about a subject to be photographed.

11. An apparatus as in claim 1 further including a plurality of additional lights including a main light, a fill light and a hair light, all controlled by said controller.

12. An apparatus as in claim 1 further comprising a main light and a main light track to which the main light is mounted for movement between a plurality of predetermined image illumination positions on the track and wherein said intensity of said background light is further controlled based on the position of said main light on said track.

13. An apparatus as in claim 12 wherein the height of said main light is adjustable and said height is also considered by the controller in controlling the intensity of said background light.

14. An apparatus as in claim 1 further comprising a multi-light lighting arrangement including a main light and a main-light position location system and wherein said controller also prevents said lighting arrangement from operating when said sensor fails to detect a subject to be photographed in the predetermined position and enables said lighting arrangement to operate when a subject to be photographed is in the predetermined position.

15. An apparatus for taking photographs in a photo studio comprising:
   (a) a subject position verification system for detecting whether a subject to be photographed is in a predetermined subject position location;
   (b) a multi-light lighting arrangement including a main light and a main-light position location system;
   (c) a background arrangement behind the subject position including a background support, a plurality of different interchangeable backgrounds and a background identification system to identify which, if any, background is in use on said support;
   (d) a camera having an actuator for taking an exposure from a predetermined area; and
   (e) a synchronizing control system coupled to said subject position verification system and said lighting arrangement which controls enablement of said camera and/or said lights to take an exposure based on signals from said subject position verification system and said light position locating system.

16. An apparatus as in claim 15 wherein said subject position verification system includes an ultrasonic sensor.

17. A method of taking photographs in a studio comprising a step of controlling the enablement of a camera to take an exposure of a subject based on input from a position verification system for detecting whether the subject to be photographed is in position with respect to a predetermined position location; wherein camera enablement requires the further step of locating a main light in a predetermined acceptable position relative to said position of said subject to be photographed and wherein camera enablement requires the further step of establishing that the main light and a modifier/baffle are matched.

18. An apparatus for taking photographs in a studio comprising:
    (a) a camera having a field of view and an actuator for initiating the capture of an image from a predetermined location;
    (b) a subject sensor that detects whether the subject to be photographed is in a predetermined location within said field of view;
    (c) a plurality of synchronized lighting devices for illuminating the subject;
    (d) a controller coupled to the sensor and said camera for controlling said synchronized lighting devices and said camera which prevents said camera from capturing an image of the subject even when said activator is activated if the sensor fails to detect a subject to be photographed in the predetermined location and enables said camera to capture an image when a subject to be photographed is in the predetermined location; and
    (e) a main light having an intensity controlled by the controller and a fill light having an intensity which is controlled by the controller, wherein said intensities are controlled at a plurality of predetermined lighting ratios, and further comprising a switch device for switching ratios among a plurality of values.

19. An apparatus as in claim 18 wherein said controller prevents said camera from capturing an image of the subject by an operation selected from the group consisting of locking the camera and preventing synchronization of said lighting or a combination thereof.

20. An apparatus as in claim 18 further comprising a plurality of interchangeable backgrounds in a system for detecting whether a background is in position and, if so, which of said backgrounds is in position.

21. An apparatus as in claim 18 wherein said subject sensor includes an ultrasonic sensing device.

22. An apparatus for taking photographs in a studio comprising:
    (a) a subject sensor that detects whether the subject to be photographed is in a predetermined position, wherein said subject sensor is capable of detecting the height of the subject to be photographed when the subject to be photographed is in the predetermined position;
    (b) a camera having an actuator for initiating the capture of an image from a predetermined area;
    (c) a controller coupled to the sensor and said camera which locks the camera from initiating the capture of an image even when said activator is activated if the sensor fails to detect a subject to be photographed in the predetermined position and enables the camera so that an image can be captured when a subject to be photographed is in the predetermined position;
    (d) a main light, having an intensity which is controlled by the controller and wherein the height of said main light is adjustable; and
    (e) a main light height sensor for detecting the height of the main light and sending a signal to the controller indicative of said height.

23. An apparatus as in claim 22 wherein the controller compares the height of the main light to the height of the subject to be photographed when the subject to be photographed is in the predetermined position and locks the camera and/or said main light from initiating the taking of a photograph if the height of the subject and the height of the light do not match as defined by a predetermined range.

24. An apparatus as in claim 23 further including a visual indicator indicating when the height of the subject and the height of the main light match as defined by said predetermined range.

25. An apparatus as in claim 23 further including an audible alarm that sounds if the actuator is actuated and the camera is locked.

26. An apparatus for taking photographs in a studio comprising:
    (a) a subject sensor that detects whether the subject to be photographed is in a predetermined position, wherein said subject sensor is capable of detecting the height of the subject to be photographed when the subject to be photographed is in the predetermined position;
    (b) a camera having an actuator for initiating the capture of an image from a predetermined area;
    (c) a controller coupled to the sensor and said camera which locks the camera from initiating the capture of an image even when said activator is activated if the sensor fails to detect a subject to be photographed in the predetermined position and enables the camera so that an image can be captured when a subject to be photographed is in the predetermined position;
    (d) a main light, having an intensity which is controlled by the controller;
    (e) a main light track to which the main light is mounted for movement between a plurality of predetermined image illumination positions about a subject to be photographed; and
    (f) at least one main light position sensor that indicates to the controller when the main light is positioned in one of said plurality of image illumination positions and in which of said image illumination positions the main light is positioned.

27. An apparatus as in claim 26 further including a removable modifier/baffle for covering the main light to create different lighting effects and a modifier/baffle sensor coupled to the controller to detect the presence of the modifier/baffle over the main light.

28. An apparatus as in claim 27 wherein said plurality of image illumination positions of the main light on a track which includes a position offset at approximately a right angle with respect to the line between the subject to be photographed and the camera.

29. An apparatus as in claim 28 wherein said controller will lock the camera and/or lights when the main light position on the track and the main light modifier/baffle are not matched.

30. An apparatus for taking photographs in a studio comprising:
    (a) a subject sensor that detects whether the subject to be photographed is in a predetermined position;
    (b) a camera having an actuator for initiating the capture of an image from a predetermined area;
    (c) a controller coupled to the sensor and said camera which locks the camera from initiating the capture of an image even when said activator is activated if the sensor fails to detect a subject to be photographed in the predetermined position and enables the camera so that an image can be captured when a subject to be photographed is in the predetermined position; and
    (d) a main light having an intensity controlled by the controller and a fill light having an intensity which is controlled by the controller, wherein said intensities are controlled at a plurality of predetermined lighting ratios, and further comprising a switch device for switching ratios among a plurality of values.

31. An apparatus as in claim 30 wherein said predetermined lighting ratios take into account the main light position and height relative to a subject, and the background positioned behind the subject.

32. An apparatus as in claim 30 wherein said switch device enables a photographer to switch the lighting ratio between a normal ratio and an increased ratio for each main light position and background combination as sensed by the apparatus.

33. An apparatus as in claim 30 wherein said subject sensor includes an ultrasonic sensing device.

* * * * *